Figure 1:
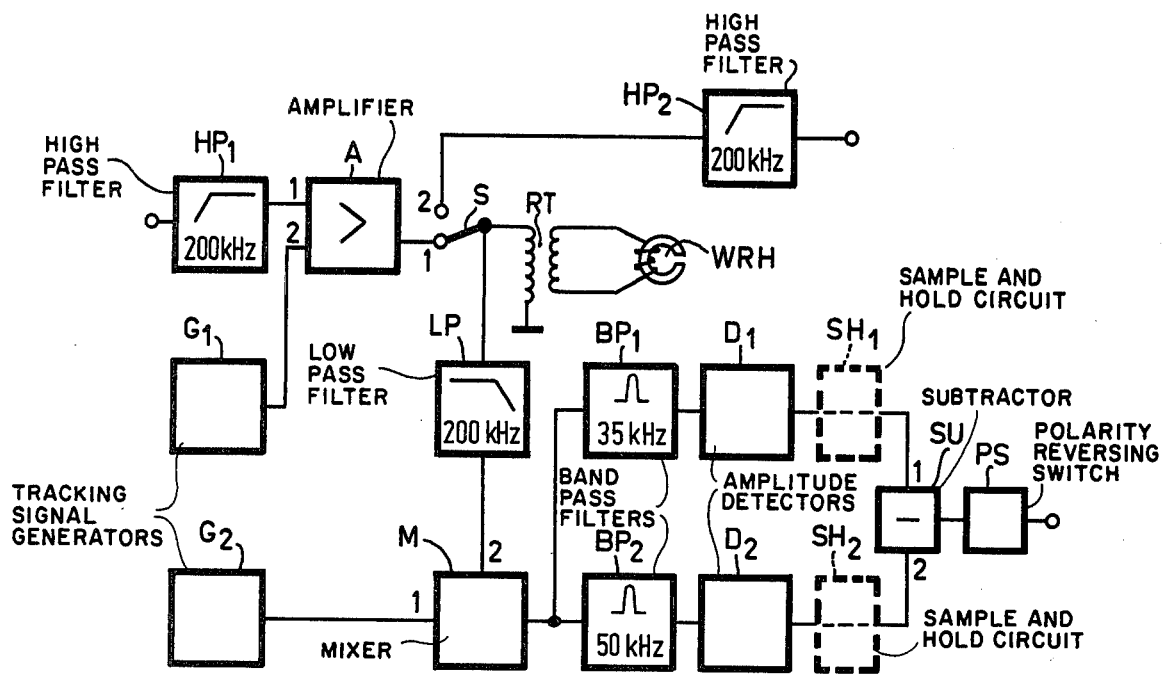

United States Patent [19]

Sanderson

[11] 4,297,733
[45] Oct. 27, 1981

[54] METHOD OF CONTROLLING THE POSITION OF A WRITE OR READ HEAD AND A DEVICE FOR CARRYING OUT THE METHOD

[75] Inventor: Hendrik J. Sanderson, Eindhoven, Netherlands

[73] Assignee: U.S. Philips Corporation, New York, N.Y.

[21] Appl. No.: 136,235

[22] Filed: Apr. 1, 1980

Related U.S. Application Data

[63] Continuation of Ser. No. 880,437, Feb. 23, 1978, abandoned.

[30] Foreign Application Priority Data

Mar. 16, 1977 [NL] Netherlands ................... 7702815

[51] Int. Cl.³ .................... G11B 5/52; G11B 21/10
[52] U.S. Cl. ..................................... 360/77; 360/70
[58] Field of Search ............... 360/77, 70, 78, 84, 360/75

[56] References Cited

U.S. PATENT DOCUMENTS

| | | | |
|---|---|---|---|
| 3,585,291 | 6/1971 | Yamakawa | 360/77 |
| 3,663,734 | 5/1972 | Trost et al. | 360/70 |
| 3,838,453 | 5/1972 | Buslik et al. | 360/77 |
| 4,044,388 | 8/1977 | Metzger | 360/77 |
| 4,056,832 | 11/1977 | de Boer et al. | 360/70 |
| 4,080,636 | 3/1978 | Ravizza | 360/107 |

OTHER PUBLICATIONS

B. C. Fiorino, Track Following Servo Indicator, IBM Tech. Disc. Bull., vol. 17, No. 4, Sep. 1974, pp. 970-971.

Primary Examiner—Alfred H. Eddleman
Attorney, Agent, or Firm—Thomas A. Briody; William J. Streeter; Algy Tamoshunas

[57] ABSTRACT

Method and device for controlling the position of a write or read head, which covers adjacent tracks on a record carrier, relative to at least one adjacent track, which tracks in addition to the information signals contain tracking signals, the tracking signal in n consecutive tracks having n different frequencies, where n≧4, and the difference of the frequencies of the tracking signals of every two adjacent tracks with the frequency of the third signal, which frequency may differ from track to track, always yielding fourth signals with the same pair of lower frequencies, a control signal being derived from said fourth signals.

6 Claims, 3 Drawing Figures

METHOD OF CONTROLLING THE POSITION OF A WRITE OR READ HEAD AND A DEVICE FOR CARRYING OUT THE METHOD

This is a continuation, of application Ser. No. 880,437, filed Feb. 23, 1978 now abandoned.

The invention relates to a method of controlling the position of a write or read head, which covers adjacent tracks on a record carrier, relative to at least one adjacent track, which tracks each contain both information and tracking signals, the tracking signals on both sides of the track being written and of the track itself having different frequencies, the tracking signals of the adjacent track or the adjacent tracks being separated from the other signals, and a control signal being derived from the separated signals, which control signal has a magnitude which is a function of the deviation of the write or read head from the correct position relative to the track to be written or read, which signal is employed for correcting said deviation.

Such a method is known from U.S. Pat. No. 4,056,832, issued Nov., 1977. In devices in which information is recorded on and subsequently read from adjacent tracks of a record carrier, in particular video signal recording and reproducing apparatus of the type in which the record carrier is helically pushed around a drum and is scanned by a rotating head, the read head should accurately follow the desired track during reading. This is in particular desirable because, in order to increase the information density, the distance between the tracks decrease and the tracks are even written so that they directly adjoin each other without any intermediate spacing, while at the same time the width of the tracks is more and more reduced and track widths of approximately 30 $\mu$m are already used, the trend being towards a further reduction of this already extremely small track width. A slight deviation from the correct track by the read head then immediately results in impermissible crosstalk of information from the adjacent track.

The composite signal from, for example, a video recorder, which signal is applied to the write-read heads during writing, first of all contains the frequency modulated luminance signal with instantaneous frequencies from 3 to 4.5 MHz and approximately 5 V amplitude. Furthermore, it contains the amplitude modulated chrominance signal around 0.5 MHz with an amplitude of approximately 250 mV. Finally, it contains the signals recorded for the purpose of tracking with an amplitude of approximately 30 mV.

The amplitude of the signal produced in the write head owing to crosstalk of the tracking signal from the preceding track is very small relative to the amplitude of the frequency modulated luminance signal and the amplitude-modulated chrominance signal, and small relative to the tracking signal which is recorded in the track written by the head, namely approximately 10 $\mu$V. Therefore, stringent requirements are imposed on the attenuation of these video signals and the tracking signal of the track being written. In order to obtain a suitable attenuation it is desirable to maximize the ratio of the frequencies of the signals to be extracted or filtered out. However, in order to reduce the amplitude of the crosstalk signals over a distance of more than one track width to a negligible value, it is necessary to reduce the wavelength of the tracking signals, i.e. to increase the frequency.

During reading the amplitudes of the various signals are of the same order of magnitude, so that it is easier to separate the tracking signals from the information.

The method in accordance with U.S. Pat. No. 4,056,832, which employs a different frequency for each of three consecutive tracks, cannot readily be used in view of these contradictory requirements. Moreover, the frequencies of the tracking signals, which have been selected to equal 1.5, 2.5 and 3.5 times the line frequency, are then spaced comparatively far away from each other, which is advantageous in view of the separation, but as a result of which the crosstalk properties differ substantially, which has an unfavorable effect on the control accuracy.

It is an object of the invention to mitigate these problems and to provide a method which combines fast control with a high sensitivity.

For this the invention is characterized in that in n consecutive tracks tracking signals of n different frequencies are recorded in a cyclic sequence, where n$\geq$4, the difference of the frequencies of the tracking signals of every two adjacent tracks with the frequency of a third signal, which frequency may differ from track to track, always yielding fourth signals with the same pair of lower frequencies, from which fourth signals the control signal is derived.

A possible choice for the frequencies of the tracking signals for n=4 is the following:

| track 1 | 135 kHz |
| track 2 | 150 kHz |
| track 3 | 120 kHz |
| track 4 | 165 kHz |
| track 5 | 130 kHz |
| etc. | |

In order to obtain the pair of fourth signals with lower frequencies, these signals may for example be mixed with the third signals whose frequencies in kHz are given in table I, which table also gives the fourth signals with lower frequencies for each track, as well as the difference signals representing the difference of the third signal with the tracking signal of the relevant track, and with the tracking signals of two tracks back or two tracks further for which the difference is the same.

TABLE I

| track | frequency of tracking signal | frequency of third signal | frequency of fourth signals | | | |
|---|---|---|---|---|---|---|
| | | | preceding track | next track | same track | 2 tracks further or back |
| 1 | 135 | 115 | 50 | 35 | 20 | 5 |
| 2 | 150 | 85 | 50 | 35 | 65 | 80 |
| 3 | 120 | 115 | 35 | 50 | 5 | 20 |
| 4 | 165 | 85 | 35 | 50 | 80 | 65 |
| 5 | 135 | 115 | 50 | 35 | 20 | 5 |
| etc. | | | | | | |

When the head scans truck nO. 1 it can be seen that the tracking signal in this track with the third signal gives a frequency difference of 20 kHz, which signal is stronger than the difference signals from the adjacent tracks and that the 35 kHz filter for the fourth signal should provide a substantial attenuation in order to obtain a low amplitude relative to the 35 kHz of said fourth signal, which is difficult, because a high selectivity is attended by a great group delay, which unfavorably affects the stability of the control system. The same is valid for track 2 for the 65 kHz signal which would have to be suppressed in the 50 kHz filter. This is possible only with additional absorption filters which should be accurately tuned to obtain a satisfactory attenuation.

In accordance with a further variant of the invention this problem is eliminated in that the frequency of the third signal each time equals the frequency of the tracking signal in the track to be recorded by the head.

If the same four frequencies are selected for the tracking signals as in the first example, but in a different sequence so as to obtain optimum frequencies for the fourth signals, the result given in table II is obtained with all the frequencies being expressed in kHz.

TABLE II

| track | freq. of tracking and third signal | frequency of fourth signal | | | |
|---|---|---|---|---|---|
| | | preceding track | next track | same track | 2 tracks further |
| 1 | 120 | 30 | 15 | 0 | 45 |
| 2 | 135 | 15 | 30 | 0 | 15 |
| 3 | 165 | 30 | 15 | 0 | 45 |
| 4 | 150 | 15 | 30 | 0 | 15 |
| 5 | 120 | 30 | 15 | 0 | 45 |
| | | etc. | | | |

It follows that the tracking signals of the track being scanned give a difference signal with a frequency which is substantially zero, so that these signals no longer have any adverse effect. However, in every other track the difference of the third signal and the crosstalk signal of the tracking signals of two tracks back or two track further is equal to the frequency of one of the desired lower frequencies and therefore cannot be filtered out. Although this undesired crosstalk signal generally has a lower amplitude than the desired signal, further attenuation of this undesired crosstalk signal is nevertheless desirable.

This is possible in accordance with an other variant of the invention where the frequency differences of the tracking signals of every two adjacent consecutive tracks alternately have the ratios of 1:3 and 3:1.

The advantage of this is that the frequencies of the desired fourth signals from which the control signal is derived are further apart and that moreover the difference frequency of one of the crosstalk signals of two tracks back or two tracks further with the third signal is now situated exactly between the frequencies of the desired fourth signals, so that the bandpass filters which filter out the desired fourth signals provide maximum attenuation. This is explained by means of table III.

TABLE III

| track | freq. of tracking and third signal | frequency of fourth signal | | | |
|---|---|---|---|---|---|
| | | preceding track | next track | same track | 2 tracks further |
| 1 | 105 | 45 | 15 | 0 | 60 |
| 2 | 120 | 15 | 45 | 0 | 30 |
| 3 | 165 | 45 | 15 | 0 | 60 |
| 4 | 150 | 15 | 45 | 0 | 30 |
| 5 | 105 | 45 | 15 | 0 | 60 |

The invention also relates to a device for carrying out the method, which device comprises:

a write-read head for simultaneously writing the information signal and reading the tracking signal recorded in the preceding track during recording, and simultaneously reading the information signal in the track to be scanned and the tracking signals in the adjacent tracks during reproduction, a circuit which is connected to the write-read head, which circuit during recording derives a control signal from the tracking signals of the track to be written and the preceding track, and during reading from the preceding and the following track, which control signal is applied to a control device which is associated with the head, which device during writing keeps the head at the correct distance from the preceding track and during reading keeps it in the correct position on the track being scanned.

In one embodiment of a device in accordance with the invention there is provided a first generator at whose output a signal is available whose frequency changes from track to track in a cyclic sequence. This signal is applied to the write-read head as a tracking signal during writing. A second generator is provided at whose output a signal is available whose frequency also changes in a cyclic sequence. The output of the second generator leads to first input of a mixing stage whose second input is connected to the write-read head via a low-pass filter which suppresses the information signals. To the output of the mixing stage, where the fourth signals of lower frequency are available, two band-pass filters are connected which are each tuned to the frequency of one of the fourth signals of lower frequency. The outputs of these bandpass filters are each connected to an amplitude detector via a hold circuit during writing and directly during reading. The outputs of the detector leads to a subtractor circuit at whose output the control signal appears. A polarity switch is provided which reverses the polarity of the control signal in a cyclic sequence.

In a further embodiment of a device in accordance with the invention the first generator also performs the function of the second generator.

In an other embodiment of a device in accordance with the invention the differences between the output frequencies of the generator for two adjacent tracks alternately have the ratios 1:3 and 3:1.

Figure 2:
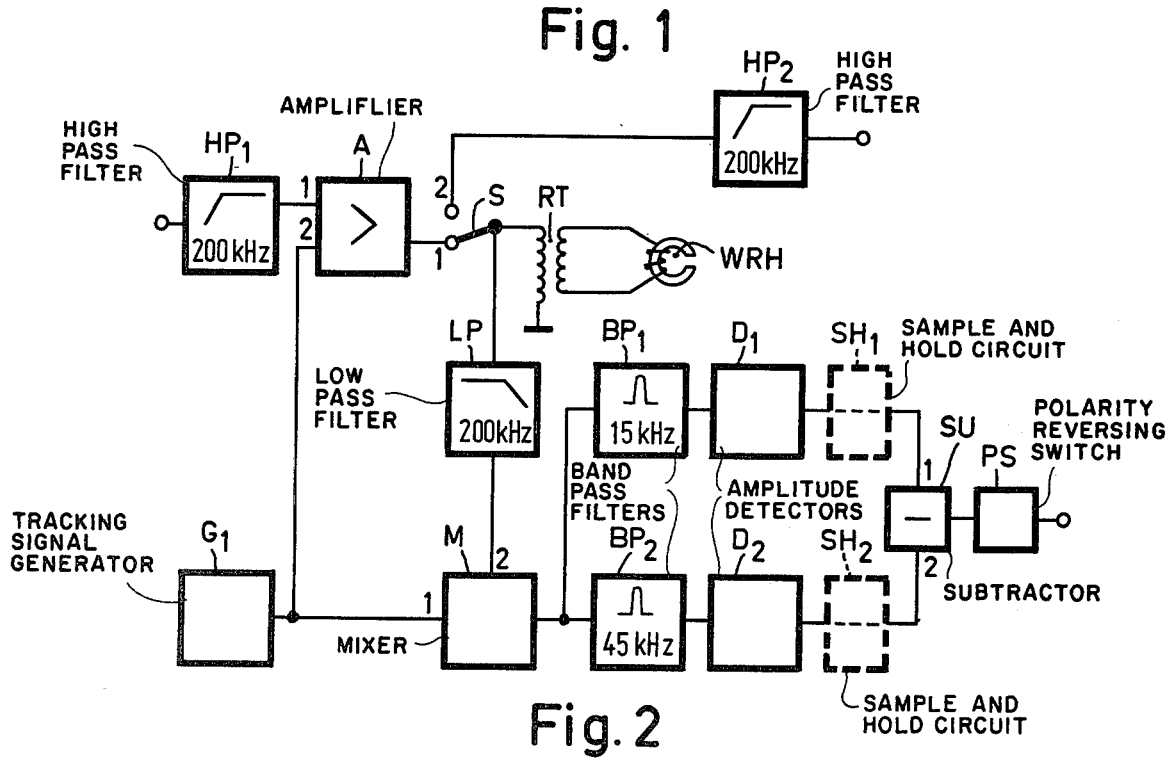

The invention will now be described in more detail with reference to the following Figures, in which FIG. 1 shows a circuit arrangement of a video signal recording and reproducing apparatus with two generators, and FIG. 2 shows such a circuit arrangement comprising one common generator.

Figure 3:
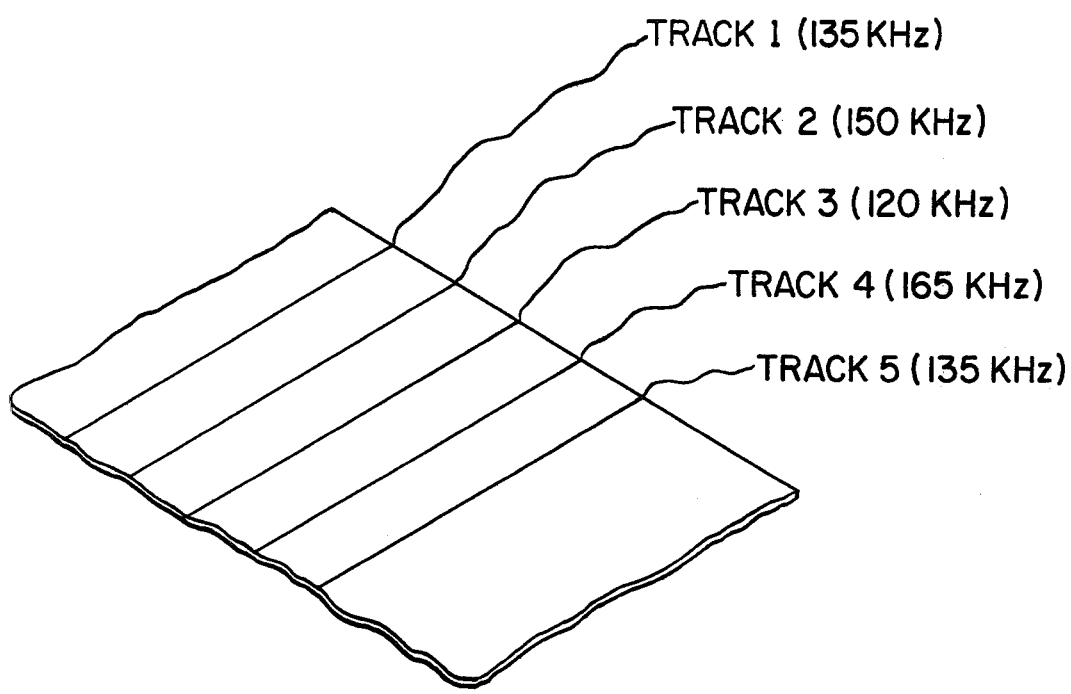

FIG. 3 shows a record carrier with a plurality of tracks thereon in accordance with Table I.

In the circuit arrangement of FIG. 1 the switch S is in position 1 during recording. The frequency modulated luminance signal together with the chrominance signal, whose frequency has been transposed, is applied to a high-pass filter $HP_1$, which cuts off all frequencies below 200 kHz. The output of this high-pass filter is connected to a first input of an amplifier A to whose second input the signals having the frequency of the desired tracking signals from the first generator $G_1$ are applied. The combined output signal of the amplifier A is applied to the write-read head WRH via the switch S and a rotary transformer RT, and to a low-pass filter LP which suppresses all frequencies above 200 kHz. The crosstalk signals from the preceding track, which signals having been read by the write-read head WRH, are also transferred to said low-pass filter LP. The output of the low-pass filter LP is connected to a second input 2 of a mixing stage M, which, from this signal and the signal from a second generator $G_2$ which is connected to the first input of mixing stage M, derives signals with the sum and the difference of the frequencies of the input signals and applies these signals to the bandpass filter $BP_1$ and $BP_2$. In the relevant example the frequency of the signals changes in a cyclic sequence, as is indicated in table I. The band-pass filters $BP_1$ and $BP_2$ are tuned to the difference frequency of the signals applied to the inputs 1 and 2 of the mixing stage M, i.e. to 35 kHz and 50 kHz respectively. The output signals of the band-pass filters are each applied to an amplitude detector $D_1$ and $D_2$ respectively, where these alternating voltages are converted into a direct voltage whose magnitude is substantially proportional to the amplitude of the input signals. The outputs of the amplitude detectors $D_1$ and $D_2$ are each connected to an input 1 and 2 respectively of a subtractor circuit SU and the difference signal is applied to a polarity switch PS which reverses the polarity of its input signals in a cyclic sequence so as to give the control signal at its output such a polarity that the deviation of the head relative to its correct position on the track to be recorded is reduced. In this case the polarity switch PS follows the subtractor circuit SU, but it is obvious that this switch may for example also be included in the input lines to the subtractor circuit SU.

During recording it is necessary to include sample and hold circuits $SH_1$ and $SH_2$ after the amplitude detectors $D_1$ and $D_2$ respectively, which sample and hold hold circuits retain the output voltages of these amplitude detectors during at least one track period, because these voltages alternately appear on the output of $D_1$ and $D_2$ respectively, i.e. because they are not continuously available.

These sample and hold hold circuits $SH_1$ and $SH_2$ may for example be constituted by a bucket brigade memory, the control speed being proportional to the number of buckets.

The control signal is applied to a control device associated with the head, for which purpose for example a device may be used as indicated in FIG. 1 of U.S. Pat. No. 4,056,832, which device consists of a piezo-electric element on which the head is mounted. Obviously, it is possible to employ an electromagnetic element instead of the piezo-electric element.

For reproduction the switch S is set to position 2 so that the combination of tracking signals from the track being scanned and from the two adjacent tracks with the information signals which is induced in the head is applied to the high-pass filter $HP_2$, which filter only transmits frequencies above 200 kHz to the circuit for processing the information signal, and to the low-pass filter LP which cuts off all frequencies above 200 kHz. The signal transmitted by said low-pass filter LP is again mixed with the signal from the second generator $G_2$ in the mixing stage M and the desired signals are extracted therefrom by the bandpass filters $BP_1$ and $BP_2$.

These signals are further processed as is described for the "recording" mode.

The drawback of the choice of these frequencies is that that the tracking signal in the recorded track yields a difference frequency of 20 kHz with a higher amplitude than the desired difference signals from the adjacent tracks, so that more stringent requirements are imposed in respect of the attenuation of these signals by the 35-kHz filter. The same applies to the next track for the 65 kHz signal in the 50 kHz filter, so that in this case additional absorption filters which are tuned to these undesired frequencies would have to be used. This drawback is eliminated by the use of a circuit arrangement as shown in FIG. 2.

In this circuit arrangement the generator $G_1$ and $G_2$ are combined, so that the frequency of the signal applied to the first input 1 of the mixing stage M is equal to the frequency of the tracking signal which during recording when the switch S is also in position 1, is applied to the write-read head WRH. Consequently the difference of these two signal components at the output of the mixing stage M is a frequency equal to 0, so that only the signal with the difference frequency of the tracking signal of the previously written track and the generator signal is transferred via the band-pass filters $BP_1$ and $BP_2$ respectively and is converted into the desired control signal in the amplitude detectors $D_1$ and $D_2$ respectively. During recording it is then also necessary to include a sample and hold circuit $SH_1$ and $SH_2$ after the band-filters $BP_1$ and $BP_2$ respectively. During reproduction the switch is again in position 2 and the process described with reference to FIG. 1 takes place, except that in this case the difference frequency of the signal from the generator $G_1$ and the tracking signal of the track being scanned is substantially equal to 0, so that this undesired component is eliminated.

If moreover the frequencies for the tracking signals are selected as indicated in Table III, the difference signals of the tracking signals of two tracks further and two tracks back with the third signal are suppressed to the same extent by the two band-pass filters.

The generators $G_1$ and $G_2$ are so-called programmed generators, whose frequency is changed upon an external command. The generators may for example comprise a number of continuously operating oscillators equal to the number of desired frequencies, which oscillators alternately supply their output signals to the generator output, or they may comprise a single high-frequency oscillator from which the desired frequencies are derived via divider circuits. It is alternatively possible to use one divider circuit, whose divisor can be changed. Changing may for example be realized by means of electronic switches, which are activated by a counter or shift-register, while in the case of video recording and playback apparatus of the type in which the record carrier is helically passed around a drum the counter or the shift register is set one position further for example by means of one or more magnets mounted on the rotary head disc, which magnets induce a voltage in a stationary coil.

Although the description by way of example refers to a magnetic recording apparatus it will be evident that the invention may also be used in other types of recording and reproducing devices, for example electrostatic or optical and for example data recorders.

What is claimed is:

1. A method of detecting the position of a magnetic recording/playback head relative to one of four or more tracks on a record carrier, said tracks containing first information signals and at least four consecutive tracks containing second tracking signals having mutually different frequencies recorded therein in cyclic sequence, said frequencies of said tracking signals being different from frequencies of said information signals, said method comprising the steps of generating a third signal having a frequency which changes from track to track in relation to the frequency of said tracking signals such that, for a given pair of adjacent tracks, the frequency of the third signal associated with one track of said pair differs from the frequency of the tracking signal recorded on the other track of said pair by one of a first and second predetermined number of cycles which are different from each other, subtracting the frequency of said third signal associated with said one track from the frequencies of tracking signals in the tracks adjacent said one track to produce a pair of fourth signals each having a frequency corresponding to said first and second number of cycles, respectively, and obtaining from said pair of fourth signals a resultant signal indicative of displacement of said head from the track being read.

2. The method according to claim 1 wherein the frequency of said first signal is equal to the frequency of the tracking signal in the track associated therewith.

3. The method according to claim 1 wherein the frequencies of said tracking signals of every two adjacent consecutive tracks alternately have the ratios 1:3 and 3:1.

4. A device for detecting the position of a recording/playback head capable of simultaneously writing an information signal in one track and reading tracking signals recorded in adjacent tracks and capable of simultaneously reading the information signal in said one track and the tracking signals in adjacent tracks during playback, said device comprising means for generating an output signal with a frequency that changes from track to track in cyclic sequence, means for applying said output signal to the head as a tracking signal when said device is in a recording mode, said tracking signal being recorded in n consecutive tracks as tracking signals of n different frequencies in cyclic sequence, where n is equal to or greater than 4, means for subtracting the frequency of said output signal from the frequencies of the tracking signals read by said head from said adjacent tracks to produce a pair of signals with the respective difference frequencies, means for subtracting the amplitudes of said pair of signals to produce an amplitude difference signal, and means for periodically reversing the polarity of said amplitude difference signal to provide an error signal indicating the position of said recording/playback head.

5. The device according to claim 4 wherein the the frequencies of said output signal assoicated with two adjacent tracks alternately have the ratios 1:3 and 3:1.

6. The method according to claim 1 wherein said step of comparing includes the steps of subtracting the amplitudes of said pair of fourth signals to provide a difference signal, and periodically reversing the polarity of said difference signal to provide an error signal indicative of the position of said head.

* * * * *